United States Patent [19]

Cukier

[11] Patent Number: 4,569,065
[45] Date of Patent: Feb. 4, 1986

[54] PHASE-LOCKED CLOCK

[76] Inventor: Maurice Cukier, 567 Vieille route de Carros, 06510 Gattieres, France

[21] Appl. No.: 645,963

[22] Filed: Aug. 31, 1984

[30] Foreign Application Priority Data

Sep. 7, 1983 [EP] European Pat. Off. ........ 83430029.5

[51] Int. Cl.$^4$ ............................................. H04L 7/00
[52] U.S. Cl. .................................. 375/120; 307/269; 307/511; 328/72; 328/155; 331/1 A
[58] Field of Search ............... 375/119, 120; 307/511, 307/262, 269; 331/1 A; 328/155, 55, 72, 63, 74; 360/51

[56] References Cited

U.S. PATENT DOCUMENTS 3,646,452  2/1972  Horowitz et al. .................. 328/155

FOREIGN PATENT DOCUMENTS 0097251  6/1982  Japan ................................. 375/120

Primary Examiner—Marc E. Bookbinder

[57] ABSTRACT

A phase-locked clock incorporating a combined phase comparator and control device (20) that controls a multiplexer (22). Multiplexer (22) receives as inputs the outputs from circuits called decoders which add a predetermined digital value to, or subtract said value from, the value applied to the inputs thereof, which latter value is received from a buffer register (30) disposed at the output of the multiplexer. The contents of the buffer register are transferred under the control of a local oscillator (10). The output from the buffer register is fed to a fixed frequency divider (13) through a carry logic circuit (32).

11 Claims, 8 Drawing Figures

FIG. 4

PHASE-LOCKED CLOCK

DESCRIPTION

1. Technical Field

This invention relates to the field of digital transmissions and, more particularly, to clocks that incorporate phase-locked oscillators and are sometimes called, for simplicity, phase-locked clocks.

2. Background Art

Digital modulators/demodulators (modems) are often used for transmission of data bits supplied by a plurality of terminals. As a general rule, the rate at which data bits are supplied by a given terminal is dependent on the type of terminal involved. However, a modem is designed to transmit bits received from one or more terminals at its own specific rate. These various rates are defined by timing devices, or clocks, which are incorporated in the modem and in each terminal.

It will readily be appreciated that all of these clocks must by synchronized to prevent losses of the data to be transmitted. To this end, the modem is usually provided with a so-called internal clock incorporating a phase-locked oscillator (PLO). The internal clock is synchronized with the clock, termed reference or external clock, of one of the active terminals attached to the modem, which particular active terminal is selected in a predetermined manner. The signal provided by the internal clock thus synchronized is then used to generate clock signals for controlling the other active terminals, each of which operates at its own particular rate.

Obviously, adjustments of the internal clock must be made as quickly as possible, which presents no major problem as long as the system configuration remains fixed. However, this configuration may subsequently change, in which case the internal clock will have to be completely readjusted.

Conventional PLOs usually include a crystal controlled oscillator which supplies a periodic signal of frequency F to a frequency divider, and a phase comparator which controls variations of the divisor of the frequency divider. The divider is termed variable divider and comprises a logic decoder followed by a n-stage binary counter designed to count up to $N=2^n-1$ under control of the crystal oscillator before changing the logic level of its output. In operation, the logic decoder initially sets the binary counter to "2" (decimal value). In other words, the counter reverts to its initial state after receiving a value of $N-1$. Thus, the frequency of the signal generated by the PLO is equal to $F/(N-1)$. Depending upon the phase difference between the external clock signal and the PLO-generated internal clock signal, the value of the divisor must be increased (to N, for example) or decreased (to N−2, for example). This is done by initially forcing the binary counter to 1 (for N) or to 3 (for N−2) so as to quickly reduce the phase difference between the internal and external clocks.

From the foregoing, it is seen that the divisor can only be changed at the beginning of a counting cycle of the binary counter. However, the control signals or commands generated by the phase comparator are transient in nature, so that they must be stored until they can be executed by changing the divisor. Also once a command has been executed, the memory must be reset to a state corresponding to normal speed, that is, to a state such that frequency F can be divided by N−1.

Furthermore, commands that initiate a change in the value of the divisor cannot be executed within a period of time shorter than the counting cycle of the binary counter.

BRIEF DESCRIPTION OF THE INVENTION

It is the object of this invention to provide a PLO wherein commands initiating adjustment through a change in the value of the divisor can be executed quasi immediately and without having to be stored.

More precisely, the invention is characterized in that it provides a multiplexing device that is controlled by the output from the phase comparator and receives as inputs the outputs from N' circuits called fast decoders that perform N' binary counts in parallel, which counts correspond to N' predetermined adjustments of the PLO.

DETAILED DESCRIPTION OF THE INVENTION

Figure 1:
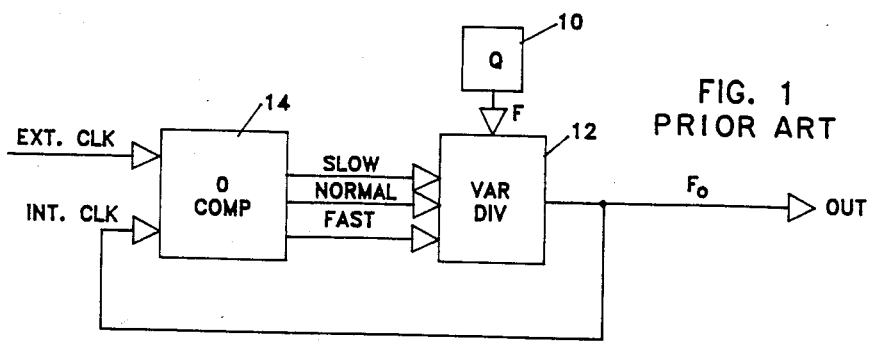
FIG. 1 is a schematic drawing of a device of the prior art.

Referring now to FIG. 1, a schematic drawing of a clock incorporating a prior art PLO is shown. A signal of frequency F>>Fo, with Fo being the internal clock (INT CLK) frequency it is desired to generate, is supplied by a crystal oscillator (Q) 10. This signal, termed fast clock signal herein, is fed to a variable divider (VAR DIV) 12 the divisor of which is adjusted according to the output from a phase comparator. The illustrated PLO provides for three different divisor settings. In one of these, referred to as "normal", the divisor is set to N−1. The other two are termed "fast" and "slow", with corresponding divisor settings of N−2 and N, respectively. Phase comparator 14 compares the phase of the internal clock signal with that of the reference or external clock (EXT CLK) signal.

Figure 2:
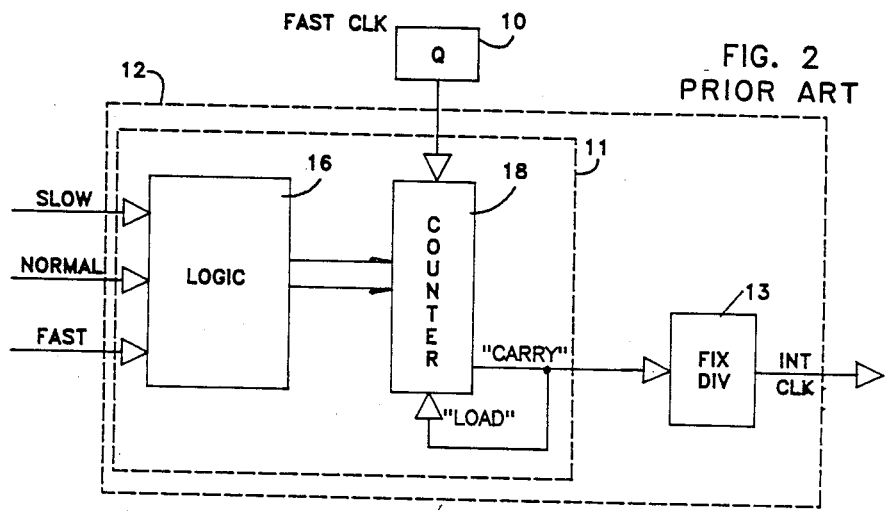
FIG. 2 illustrates an embodiment of one of the elements of the device of FIG. 1.

Referring now to FIG. 2, an embodiment of the divider 12 of FIG. 1 is shown. Divider 12 is comprised of a variable divider 11, which divides by 8±1, and a so-called fixed divider (FIX DIV) 13, which divides by a fixed value of 20.

Figure 3:
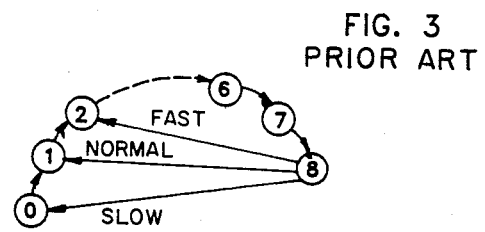
FIG. 3 is a schematic diagram of the states of the device of FIG. 2.

As shown, variable divider 11 comprises a logic device 16 that controls a binary counter 18. This may be, for example, a modulo 9 counter that counts from zero to eight (decimal value) and changes the logic level of its carry output at the count of eight. The carry output is effective to reset the counter to its initial state and to initiate a new counting cycle. Depending on the command received by logic device 16, counter 18 resumes counting beginning with the count of 0, 1 or 2, as shown in FIG. 3. Logic device 16 includes means for converting the command generated by phase comparator 14 into a digital value equivalent to decimal 0, 1 or 2, and means for storing that digital value until counter 18 reaches the maximum count of eight and returns to zero. The counter is then set at the stored digital value, which becomes its initial count.

Thus, it is necessary to provide means for storing the command generated by phase comparator 14, and the command itself cannot be executed immediately.

It should be noted that, in practice, the phase-locked clock is adjusted by speeding up or slowing down counter 18 during a single counting cycle. Thereafter, the counter resumes normal counting until a new command calling for faster or slower operation is received by the variable divider.

Figure 4:
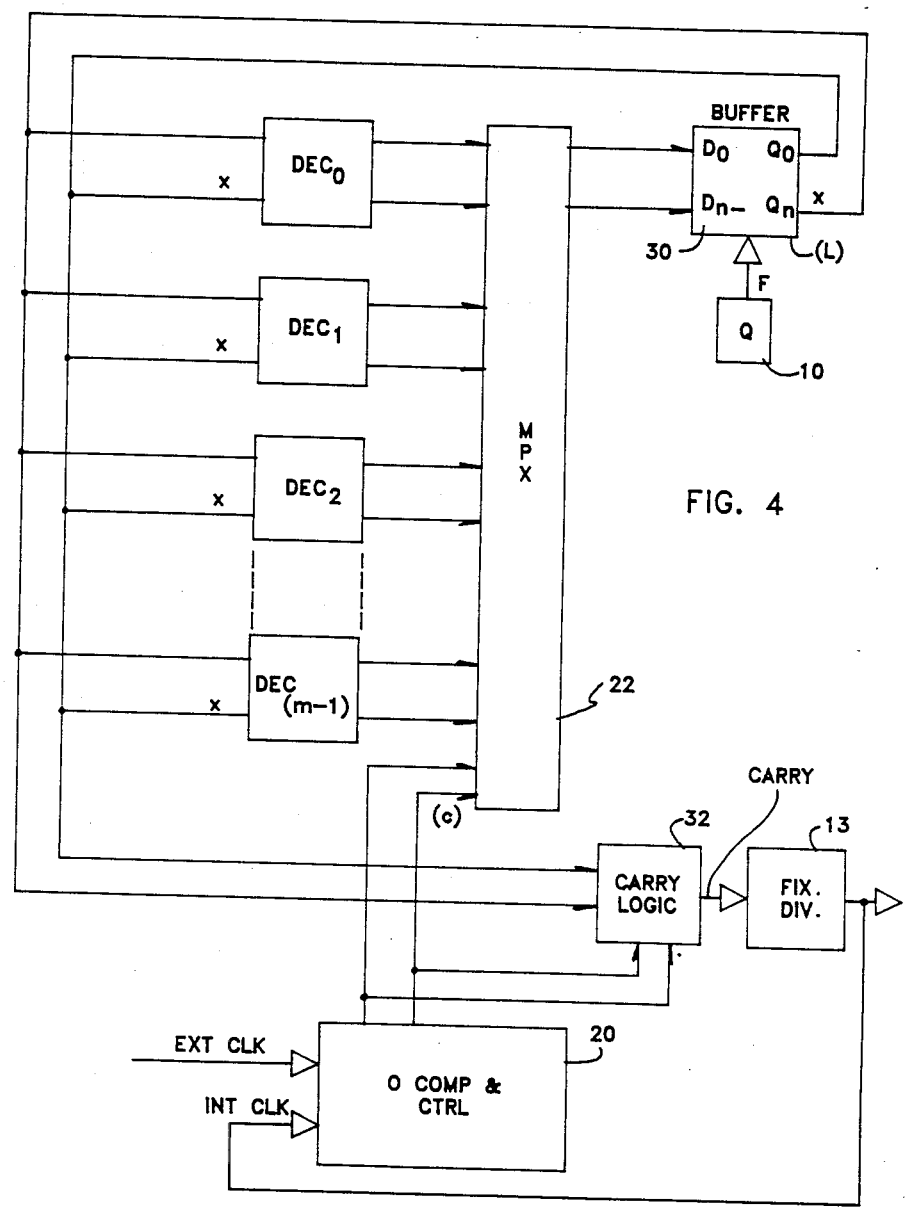
FIG. 4 is a schematic diagram of the device of the invention.

Referring now to FIG. 4, there is shown a schematic diagram of the phase-locked clock of the present invention which is designed to overcome the above-mentioned difficulties.

As shown, the clock includes a combined phase comparator and control device 20 provided with an output bus C comprising a number of control lines. The control signal (termed adjustment command) placed on these lines indicates whether the internal clock is fast or slow (or more precisely leading or lagging) in relation to the external clock. The signal can further serve to quantify the disparity between the two clocks.

The control signal placed on bus C by device 20 is effective to route the digital output from any one of a plurality of decoders $DEC_0$–$DEC_{(m-1)}$ to the output of a multiplexer (MPX) 22. These decoders respectively convert the n-bit digital value x they receive as an input into digital values such as x, x±1, x±2, etc. In other words, each decoder adds a predetermined digital value to, or substracts same from, the digital value applied to its input. For example, if m=3, the decoded digital values may be x, x+1, x+2. The digital value obtained at the output of multiplexer 22 is stored in a buffer register 30 comprised of bistable latches (L). THe contents of buffer 30 are fed back to the input of decoders $DEC_0$–$DEC_{(m-1)}$ at the frequency F of the local crystal oscillator 10 (also called fast clock).

Lastly, a carry logic circuit 32, also disposed at the output of register 30, provides an output signal which, after the frequency thereof has been divided up in fixed divider 13, becomes the internal clock (INT CLK) signal to be applied to the second input of phase comparator 20, the first input of which receives the external clock (EXT CLK) signal.

As long as no transition of the external clock signal occurs, phase comparator 20 selects the particular decoder, the output of which provides the value x+1. The assembly comprised of the decoder, the multiplexer and the buffer register then acts as a simple modulo n' counter, with n' being a given predetermined value such as 9.

As soon as a transition of the external clock signal occurs, phase comparator 20 selects, on the basis of the phase difference to be corrected, the decoder the output of which is to be gated through the multiplexer to provide the appropriate correction. The amplitude of such correction can thus be controlled.

As has been seen, the "variable divider" function necessary to implement the phase-locked clock is performed by a variable counter. This principle holds true for the device of the present invention, which however imparts greater flexibility to the variable counter.

Figure 5:
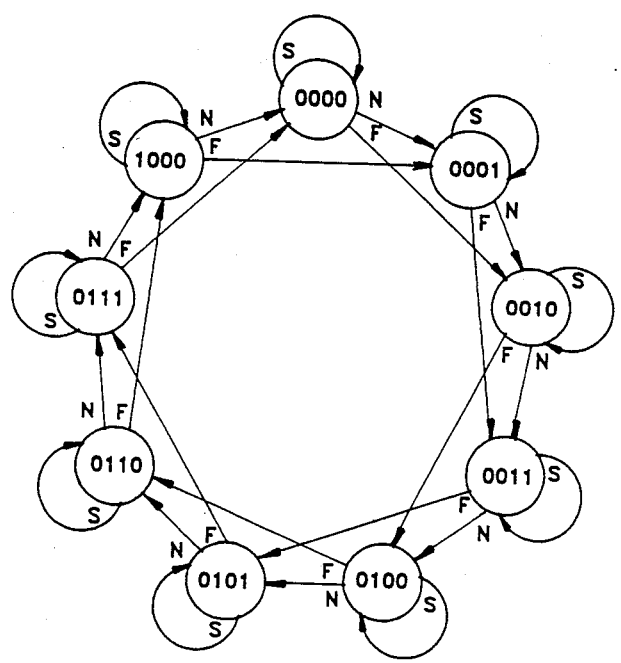
FIG. 5 is a schematic diagram of the states of a counter to provide a better understanding of the invention.

Referring now to FIG. 5, there is shown a diagram of the various states of a modulo 9 counter, that is, a counter that counts from zero (000 in binary notation) to 8 (binary 1000). This counter can at any time either remain in its current state (in which case a logic signal S=1), or go to the immediately following state (in which case N=1), or skip one state (in which case F=1). Signals N, F, S are those generated by combined phase comparator and control device 20 and are placed on bus C.

As long as no positive-going transition of the external clock (EXT CLK) signal is detected (N=1 and F=S=0), each cycle of oscillator 10 increments the counter by one. Upon detecting the occurrence of a positive going transition of the external clock signal coincident with a low or 0 logical level of the internal clock (INT CLK) signal, phase comparator 20 causes the counter to speed up (F=1). One state of the counter is skipped at each counting step. (In this case, N=0, F=1, S=0). Conversely, when a positive going transition of the external clock signal coincides with a high logical level of the internal clock signal, phase comparator 20 causes the counter to slow down (N=F=0, S=1). The counter will remain in the same state as long as S=1.

Thus, the three conditions N, F, S are mutually exclusive:

$$N+F+S=1$$

$$N \cdot F + N \cdot S + F \cdot S = 0$$

Decoder $DEC_1$, which performs the operation x→x+1 (N=1, F=0, S=0), is governed by the following relations:

| CURRENT STATE | | | | NEXT STATE | | | |
|---|---|---|---|---|---|---|---|
| $Q_0$ | $Q_1$ | $Q_2$ | $Q_3$ | $D_0$ | $D_1$ | $D_2$ | $D_3$ |
| 0 | 0 | 0 | 0 | 0 | 0 | 0 | 1 |
| 0 | 0 | 0 | 1 | 0 | 0 | 1 | 0 |
| 0 | 0 | 1 | 0 | 0 | 0 | 1 | 1 |
| 0 | 0 | 1 | 1 | 0 | 1 | 0 | 0 |
| 0 | 1 | 0 | 0 | 0 | 1 | 0 | 1 |
| 0 | 1 | 0 | 1 | 0 | 1 | 1 | 0 |
| 0 | 1 | 1 | 0 | 0 | 1 | 1 | 1 |
| 0 | 1 | 1 | 1 | 1 | 0 | 0 | 0 |
| 1 | 0 | 0 | 0 | 0 | 0 | 0 | 0 |

Hence
$D_0 = \overline{Q_0} Q_1 Q_2 Q_3$
$D_1 = \overline{Q_1} \oplus Q_2 Q_3$
$D_2 = Q_2 \oplus Q_3$
$D_3 = \overline{Q_0 Q_3}$ Decoder $DEC_2$, which performs the operation x→x+2 (N=0, F=1, S=0), is governed by the following relations:

| CURRENT STATE | | | | NEXT STATE | | | |
|---|---|---|---|---|---|---|---|
| $Q_0$ | $Q_1$ | $Q_2$ | $Q_3$ | $D_0$ | $D_1$ | $D_2$ | $D_3$ |
| 0 | 0 | 0 | 0 | 0 | 0 | 1 | 0 |
| 0 | 0 | 1 | 0 | 0 | 1 | 0 | 0 |
| 0 | 1 | 0 | 0 | 0 | 1 | 1 | 0 |
| 0 | 1 | 1 | 0 | 1 | 0 | 0 | 0 |
| 1 | 0 | 0 | 0 | 0 | 0 | 0 | 1 |
| 0 | 0 | 0 | 1 | 0 | 0 | 1 | 1 |
| 0 | 0 | 1 | 1 | 0 | 1 | 0 | 1 |
| 0 | 1 | 0 | 1 | 0 | 1 | 1 | 1 |
| 0 | 1 | 1 | 1 | 0 | 0 | 0 | 0 |

$D_0 = \overline{Q_0} Q_1 Q_2 \overline{Q_3}$
$D_1 = Q_1 \oplus Q_2$
$D_2 = \overline{Q_0 Q_2}$ $D_3 = Q_0 + Q_3(\overline{Q_1} + \overline{Q_2})$ Decoder $DEC_0$, which performs the operation $x \to x$, is of course governed by the relations:

$D_0 = Q_0$
$D_1 = Q_1$
$D_2 = Q_2$
$D_3 = Q_3$

In the case of $DEC_0$, the logic signals used are $N = F = 0$ and $S = 1$.

Figure 6:
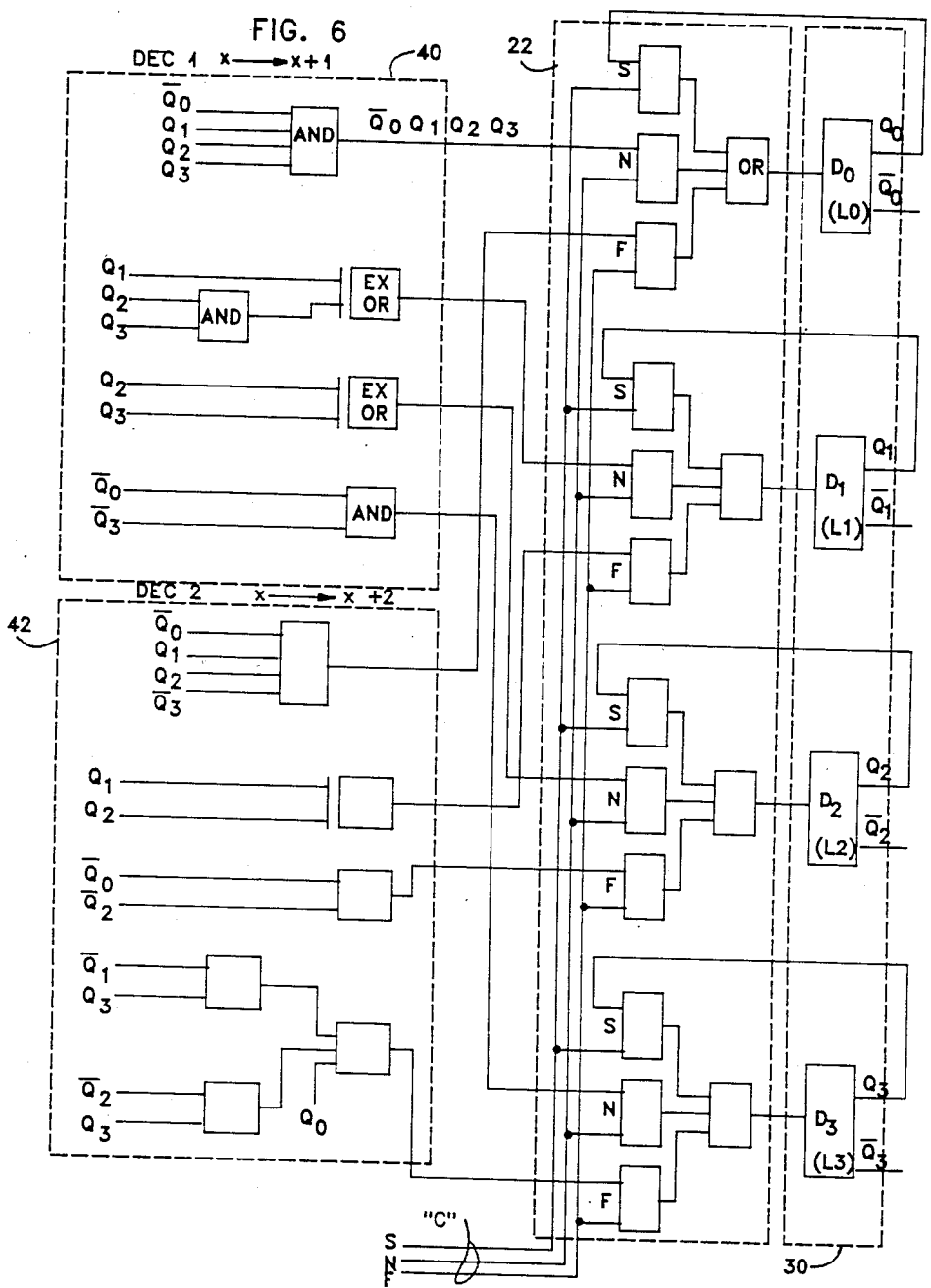
FIGS. 6 to 8 illustrate embodiments of circuitry used in the invention.

The general equations for the assembly comprising three decoders ($DEC_0$ for $x \to x$, $DEC_1$ for $x \to x+1$, and $DEC_2$ for $x \to x+2$), multiplexer 22 and its commands as applied onto bus C, and the buffer register, are written:

$D_0 = N\overline{Q_0}Q_1Q_2Q_3 + F\overline{Q_0}Q_1Q_2\overline{Q_3} + SQ_0$ $D_1 = N(\overline{Q_1} \oplus Q_2Q_3) + F(Q_1 \oplus Q_2) + SQ_1$ $D_2 = N(Q_2 + Q_3) + F\overline{Q_0}\overline{Q_2} + SQ_2$ $D_3 = N\overline{Q_0}\overline{Q_3} \oplus F[Q_0 + Q_3(\overline{Q_1} + \overline{Q_2})] + SQ_3$ Referring now to FIG. 6, an embodiment of a logic circuit performing the functions of the general equations defined above is shown. This embodiment makes use of conventional AND, OR and Exclusive OR (XOR) logic circuits, and latches $L_0$–$L_3$ forming buffer register 30. Decoders $DEC_1$ and $DEC_2$ are shown at 40 and 42. Decoder $DEC_0$ is formed quite simply by feeding back the signals present on outputs $Q_0$–$Q_3$ of latches $L_0$–$L_3$ to multiplexer 22 under control of logic signal $S = 1$.

Figure 7:
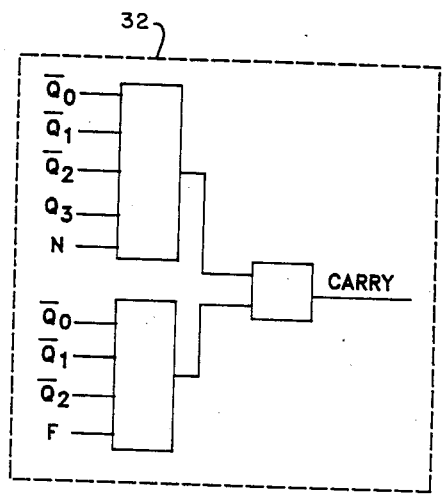

Similarly, FIG. 7 illustrates the logic circuit 32 that performs the carry logic function.

The purpose of this logic function is to either increase or decrease by one the counting cycle of the variable counter, and to do so in a unique and unambiguous manner. In the absence of this function, the counter might either skip the state 0000 and directly go from 1000 to 0001 (if $F = 1$) without indicating this by means of a carry, or remain at 000 (if $S = 1$). In either situation, no variable divider capable of dividing by $8 \pm 1$ under any circumstances could be realized. This amounts to saying that, for example, it is necessary to detect every theoretically possible occurrence of the counter going through the state 0001 of the diagram of FIG. 5.

Carry = 1 for:

$\overline{Q_0}\overline{Q_1}\overline{Q_2}Q_3 N + \overline{Q_0}\overline{Q_1}Q_2Q_3 F + \overline{Q_0}\overline{Q_1}Q_2\overline{Q_3} F$ hence the carry function becomes:

$\overline{Q_0}\overline{Q_1}\overline{Q_2}Q_3 N + \overline{Q_0}\overline{Q_1}Q_2 F = 1$.

Figure 8:
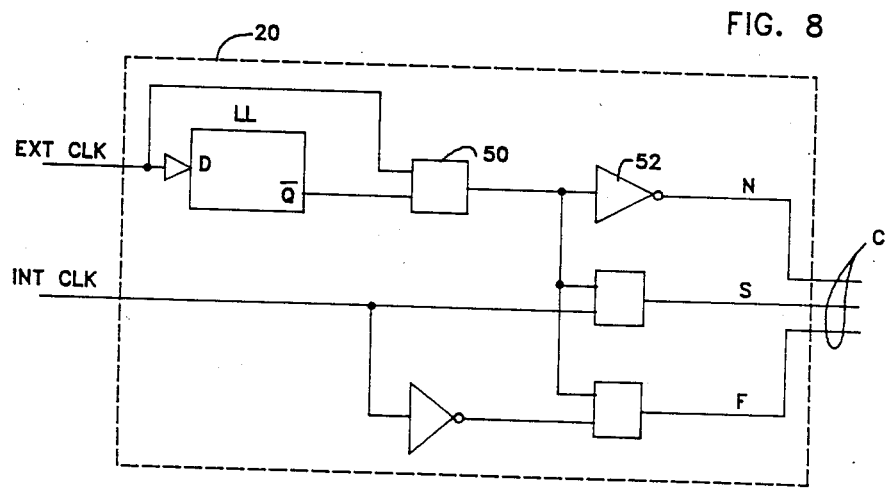

Referring now to FIG. 8, an embodiment of phase comparator 20 is shown. A latch (LL) and an AND circuit 50 are effective to detect the occurrence of a positive-going transition of the external clock (EXT CLK) signal. The absence of this transition is signaled by an inverter 52 and results in a command $N = 1$. However, if the internal clock (INT CLK) signal is at an up logic level at the time the transition of the external clock signal is detected, this indicates that the internal clock must be slowed down ($S = 1$). Conversely, if the internal clock signal is at a low logic level at the time the transition of the external clock signal is detected, then the internal clock must be made to run faster ($F = 1$).

Thus, the device of the invention acts as a phase-locked clock that can be adjusted quasi immediately and is particularly advantageous since the decisions to modify the cycle of the variable counter can be carried out during any of the steps of the counting cycle and, therefore, need not be stored. Also, the amount of correction can readily be varied by providing a plurality of decoders (more than three, for example). This would enable the variable divider to be adjusted according to the phase difference between the internal and external clock signals. All that would be required to do so would be to detect the leading edges of the internal clock signal, to measure the phase difference between these leading edges and those of the external clock signal and to determine the sign of said difference, and then to set the amount of skip according to a table in which the corrections required would be predetermined by quantifying the phase differences.

While the invention has been particularly shown and described with reference to a preferred embodiment thereof, it will be understood by those skilled in the art that numerous changes in form and detail may be made therein without departing from the spirit and scope of the invention.

What is claimed is:

1. A phase-locked clock generating a so-called internal clock signal and causing said signal to be synchronized with a reference signal called external clock signal, said phase-locked clock being characterized in that it includes:
   a combined phase comparator and control device that compares the phase of said internal clock signal with that of said external clock signal and generates a control signal termed adjustment command;
   a multiplexer controlled by said adjustment command,
   m decoder circuits the outputs of which are connected to an input of said multiplexer;
   a buffer register connected to the output of said multiplexer and controlled by the output signal from a local oscillator, to enable the output signal from said multiplexer to be fed back to the inputs of said m decoder circuits at a rate defined by said local oscillator; and,
   a carry logic circuit connected to the outputs of said buffer register and said phase comparator for generating said internal clock signal.

2. A phase-locked oscillator according to claim 1, characterized in that it includes a fixed-frequency divider connected to said carry logic circuit and delivering said internal clock signal.

3. A phase-locked clock according to claim 1 or 2, further characterized in that said decoder circuits individually add a predetermined digital value to, or subtract said digital value from, the digital value applied to the inputs thereof and received from said buffer register.

4. A phase-locked clock according to claim 3, characterized in that $m = 3$.

5. A phase-locked clock according to claim 4, characterized in that said adjustment command consists of three logic signals each of which causes the digital value from one of the three decoders to be transferred to the output of said multiplexer.

6. A phase-locked clock according to claim 5, characterized in that said phase comparator generates an adjustment command termed "fast" or "slow" depending upon the logic level of the internal clock signal at the time defined by a transition, occurring in a predetermined direction, of the external clock signal.

7. A phase-locked clock according to claim 4, characterized in that the three decoders respectively perform operations consisting of adding the digital value zero, one or two to the digital value x applied to the inputs thereof.

8. A phase-locked clock according to claim 6, characterized in that the three decoders respectively perform operations consisting of adding the digital value zero, one or two to the digital value x applied to the inputs thereof.

9. A phase-locked clock according to claim 7, characterized in that as long as no transition, occurring in a predetermined direction, of the external clock signal takes place at the times defined by the output signal from said local oscillator, the multiplexer is effective to transfer to said buffer register the signal supplied by the decoder that performs the operation x+1.

10. A phase-locked clock according to claim 8, characterized in that as long as no transition, occurring in a predetermined direction, of the external clock signal takes place at the times defined by the output signal from said local oscillator, the multiplexer is effective to transfer to said buffer register the signal supplied by the decoder that performs the operation x+1.

11. A phase-locked clock according to claim 1, characterized in that said combined phase comparator and control device generates a command that causes operation to either speed up or slow down depending on whether the logic level of the internal clock signal is high or low at the occurrence of the transition, in a predetermined direction, of said external clock signal.

* * * * *

UNITED STATES PATENT AND TRADEMARK OFFICE
CERTIFICATE OF CORRECTION

PATENT NO. : 4,569,065

DATED : Feb. 4, 1986

INVENTOR(S) : Maurice Cukier

It is certified that error appears in the above–identified patent and that said Letters Patent are hereby corrected as shown below:

On the title page Insert

-- Assignee: International Business Machines Corp., Armonk, New York --.

Signed and Sealed this

Eleventh Day of November, 1986

Attest:

DONALD J. QUIGG

Attesting Officer      Commissioner of Patents and Trademarks